United States Patent
Rampalli et al.

(10) Patent No.: US 11,454,060 B2
(45) Date of Patent: Sep. 27, 2022

(54) BIDIRECTIONAL DOOR OPENING STRUCTURE

(71) Applicants: Hyundai Motor Company, Seoul (KR); Kia Motors Corporation, Seoul (KR)

(72) Inventors: Sudhir Rampalli, Hyderabad (IN); Ki Hyun Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 116 days.

(21) Appl. No.: 16/924,456

(22) Filed: Jul. 9, 2020

(65) Prior Publication Data
US 2021/0172234 A1    Jun. 10, 2021

(30) Foreign Application Priority Data
Dec. 10, 2019    (KR) .................. 10-2019-0163263

(51) Int. Cl.
*B60J 5/02*    (2006.01)
*E05F 15/63*    (2015.01)
*B60J 5/10*    (2006.01)

(52) U.S. Cl.
CPC .............. *E05F 15/63* (2015.01); *B60J 5/02* (2013.01); *B60J 5/102* (2013.01);
(Continued)

(58) Field of Classification Search
CPC ......... E05F 17/00; E05F 15/616; E05F 15/53; E05F 15/611; E05F 2017/008;
(Continued)

(56) References Cited

U.S. PATENT DOCUMENTS 7,097,229 B1 *    8/2006    Chernoff .................. B60J 5/047
                                                296/146.1
9,016,762 B2 *    4/2015    Ojima ...................... B60J 5/047
                                                296/155
(Continued)

FOREIGN PATENT DOCUMENTS

CN    107264242 A    * 10/2017
CN    208544096 U   *  2/2019
(Continued)

OTHER PUBLICATIONS

English translation (machine generated) of DE-102015211065-A1 published Dec. 2016 (Year: 2016).*

*Primary Examiner* — Jerry E Redman
(74) *Attorney, Agent, or Firm* — Slater Matsil, LLP (57) ABSTRACT

A bidirectional door opening structure includes a first door configured to be opened by rotating about a first end of a vehicle that is adjacent to a roof of the vehicle, a second door configured to be opened by rotating about a second end of the vehicle that is adjacent to the roof of the vehicle, the second end being opposite the first end, a drive unit disposed at a portion of the roof between the first door and the second door, and a controller configured to receive a door drive request with respect to the first door or the second door and to apply a driving force to at least one of the first door or the second door, wherein the drive unit comprises a spindle unit, a latching lever, and a rotation lever.

20 Claims, 7 Drawing Sheets (52) U.S. Cl.
CPC ... *E05Y 2201/224* (2013.01); *E05Y 2201/422* (2013.01); *E05Y 2201/626* (2013.01); *E05Y 2201/686* (2013.01); *E05Y 2201/702* (2013.01); *E05Y 2900/531* (2013.01)

(58) Field of Classification Search
CPC ......... E05Y 2201/426; E05Y 2201/636; E05Y 2201/684; E05Y 2201/702; E05Y 2201/22; E05Y 2201/62; E05Y 2201/628; E05Y 2201/448; E05Y 2600/45; E05Y 2900/531; E05Y 2400/42; E05D 5/062; E05D 1/02; B60J 5/02; B60J 5/101
USPC ...... 296/146.8, 147, 107.09, 107.11, 107.16, 296/107.17
See application file for complete search history.

(56) References Cited

U.S. PATENT DOCUMENTS

| | | | |
|---|---|---|---|
| 10,272,748 B2* | 4/2019 | Shin | E05B 83/38 |
| 2006/0197357 A1* | 9/2006 | Catania | B60J 5/12 |
| | | | 296/155 |
| 2008/0104890 A1* | 5/2008 | Starheim | E05F 15/627 |
| | | | 49/346 |
| 2012/0167468 A1* | 7/2012 | Hozumi | B60J 5/06 |
| | | | 49/209 |
| 2014/0059925 A1* | 3/2014 | Marsh | E04H 1/1205 |
| | | | 47/17 |
| 2016/0177612 A1* | 6/2016 | Buchheim | E05F 15/622 |
| | | | 296/50 |
| 2016/0325712 A1* | 11/2016 | Goto | E05B 81/64 |
| 2016/0340938 A1* | 11/2016 | Chiba | B60J 5/06 |
| 2018/0251014 A1* | 9/2018 | Baccouche | B60J 5/0473 |
| 2018/0334321 A1* | 11/2018 | Strasser, Sen. | E05F 15/53 |
| 2020/0370629 A1* | 11/2020 | Taylor | F16C 29/008 |
| 2021/0172213 A1* | 6/2021 | Cho | E05B 81/20 |
| 2021/0172239 A1* | 6/2021 | Cho | E05F 17/00 |
| 2021/0291632 A1* | 9/2021 | Ding | E05F 15/40 |
| 2021/0362570 A1* | 11/2021 | Ledwell | E05F 1/1091 |

FOREIGN PATENT DOCUMENTS

| | | | | |
|---|---|---|---|---|
| CN | 213676921 U | * | 7/2021 | |
| DE | 102011081787 A1 | * | 2/2013 | ............ B60J 5/0486 |
| DE | 102015211065 A1 | * | 12/2016 | ............ B60J 5/0473 |
| KR | 20130033768 A | | 4/2013 | |

* cited by examiner

BIDIRECTIONAL DOOR OPENING STRUCTURE

CROSS-REFERENCE TO RELATED APPLICATIONS

This application claims priority to Korean Patent Application No. 10-2019-0163263, filed on Dec. 10, 2019, which application is hereby incorporated herein by reference.

TECHNICAL FIELD

The present disclosure relates to a bidirectional door opening structure.

BACKGROUND

In general, a vehicle is equipped with doors having a swing structure in which the doors are opened by swinging in an outward direction. In the case of a door having a swing structure, a driver or a passenger unlocks the door using a handle mounted to the door, and rotates the door in an outward direction to make a space between the door and the vehicle body through which the driver or the passenger gets into or out of the vehicle.

Meanwhile, a door having a sliding structure, in which the door is opened and closed by sliding in a forward-backward direction, may be applied to vans, concept cars, and the like.

In the case of a door having a sliding structure, a driver or a passenger unlocks the door using a handle mounted to the door, and slides the door in a forward-backward direction to make an entrance space in the side surface of the vehicle body through which the driver or the passenger gets into or out of the vehicle.

With the recent development of vehicles having an autonomous driving function, the standards for a driver's seat, required in order for a driver to drive a vehicle, have been relaxed, and various technologies enabling convenient entry into and exit from a vehicle are being researched and developed.

Therefore, in order to enable convenient access to the interior of a vehicle, there is the need for doors capable of being opened in directions opposite each other with respect to the roof of a vehicle, and there is thus the need for a structure for opening two opposite doors.

The above information disclosed in this Background section is only for enhancement of understanding of the background of the disclosure, and therefore it may contain information that does not form the related art that is already known to a person of ordinary skill in the art. Korean Patent Application No. 10-2011-0097657 discloses subject matter that is related to subject matter disclosed herein.

SUMMARY

The present disclosure relates to a bidirectional door opening structure. Particular embodiments relate to a bidirectional door opening structure for a vehicle, which simultaneously or selectively opens a first door and a second door, which are respectively provided at a front portion and a rear portion of a vehicle and are configured to be opened by rotating in the height direction of the vehicle, using a single drive unit in response to a drive request applied to the first door and/or the second door.

Embodiments of the present disclosure can solve problems associated with the related art, and an embodiment of the present disclosure provides a first door, which is opened by rotating about one end of the roof of a vehicle, and a second door, which is opened by rotating about the opposite end of the roof of the vehicle.

Another embodiment of the present disclosure provides a bidirectional door opening structure for simultaneously or selectively opening the first door and the second door using a single drive unit.

The embodiments of the present disclosure are not limited to the above-mentioned features, and other features not mentioned herein will be clearly understood by those skilled in the art from the following description, and will become apparent with reference to the described embodiments of the present disclosure. In addition, the embodiments of the present disclosure can be accomplished by the components described in the appended claims and combinations thereof.

One embodiment of the present disclosure provides a bidirectional door opening structure including a first door configured to be opened by rotating about one end of a vehicle that is adjacent to the roof of the vehicle, a second door configured to be opened by rotating about the opposite end of the vehicle that is adjacent to the roof of the vehicle, a drive unit disposed at a portion of the roof between the first door and the second door and configured to open and close the first door and the second door, and a controller configured to receive a door drive request with respect to the first door or the second door and to apply driving force to at least one of the first door or the second door that is requested to be driven through the drive unit, wherein the drive unit includes a spindle unit configured such that the length thereof is bidirectionally increased in a width direction, a latching lever configured to be interlocked with the spindle unit such that driving force of the spindle unit is applied thereto, and a rotation lever configured to convert driving force transmitted from the latching lever into driving force applied in a longitudinal direction.

In a preferred embodiment, the bidirectional door opening structure may further include a connection rod configured to be moved in the longitudinal direction in accordance with rotation of the rotation lever and connected at an end thereof to a hinge part coupled to the inner side of a corresponding one of the first door and the second door. When the rotation lever is rotated, the connection rod may be moved in the longitudinal direction of the vehicle to open and close a corresponding one of the first door and the second door through the hinge part.

In another preferred embodiment, the connection rod may include a first connection rod interlocked with the first door and a second connection rod interlocked with the second door, the bidirectional door opening structure may further include an elastic member disposed between the first connection rod and the second connection rod, and when the distance between the first connection rod and the second connection rod increases or decreases, the elastic member may apply elastic force in a direction opposite the direction in which the first connection rod and the second connection rod are moved.

In still another preferred embodiment, the rotation lever and the connection rod may be engaged with each other using gears, and when the rotation lever is rotated, the connection rod may be moved in the longitudinal direction of the vehicle.

In yet another preferred embodiment, the controller may move at least a portion of the latching lever, located corresponding to at least one of the first door or the second door that is requested to be driven, such that the latching lever is interlocked with the spindle unit.

In still yet another preferred embodiment, the controller may include a driving part configured to apply driving force to the latching lever, located corresponding to at least one of the first door or the second door that is requested to be driven, such that at least a portion of the latching lever is located in a path along which the spindle unit moves.

In a further preferred embodiment, the bidirectional door opening structure may further include a link rod disposed between the latching lever and the rotation lever.

In another further preferred embodiment, upon receiving a door drive request, the controller may control the spindle unit to be driven.

In still another further preferred embodiment, the bidirectional door opening structure may further include a transfer plate, on which the latching lever is disposed, and a transfer slot formed in the transfer plate. The rotation shaft of the latching lever may be moved along the transfer slot by the spindle unit.

In yet another further preferred embodiment, the bidirectional door opening structure may further include a stopper disposed on one surface of the latching lever that faces the transfer plate, and a fixing slot formed in the transfer plate. In the state in which the latching lever is released from the spindle unit, the stopper may be fixed in the fixing slot, and when the latching lever is interlocked with the spindle unit, the stopper may be released from the fixing slot.

In still yet another further preferred embodiment, the fixing slot may include a lower fixing slot, into which the stopper is inserted in the state in which a corresponding one of the first door and the second door is opened, and an upper fixing slot, into which the stopper is inserted in the state in which a corresponding one of the first door and the second door is closed.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes, will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter, embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be more thorough and complete, and will more fully convey the scope of the disclosure to those skilled in the art.

The terms "part", "unit", and "member" used in the specification mean units for processing at least one function or operation, and may be implemented using hardware components, software components, or combinations thereof.

Further, the terms "first" and "second" used in the description of constituent elements mentioned below are intended only to distinguish one element from another element, and are unrelated to the order between the constituent elements.

Furthermore, in the description of constituent elements mentioned below, the term "first" may mean one end in the longitudinal direction or the width direction of the vehicle, and the term "second" may mean the other end in a direction opposite the first direction.

Furthermore, although an embodiment in which the first direction means the front end in the longitudinal direction of the vehicle will be described below by way of example, the orientation of the two opposite doors is not limited thereto.

Furthermore, the components associated with each of a first door 110 and a second door 120, which have the same driving structure as each other, and associated with a drive unit 140 may be described below, with the terms "first" and "second" omitted.

Furthermore, in the specification, the term "drive request" conceptually includes both a door-opening drive request and a door-closing drive request.

Embodiments of the present disclosure relate to a vehicle including two opposite doors and to a bidirectional door opening structure 100. In embodiments of the present disclosure, a first door 110 is configured such that, with respect to the end thereof that is adjacent to a roof 200, the opposite end thereof is opened by rotating upwards in the height direction of the vehicle. A first lower door 111 is located adjacent to the opposite end of the first door 110.

A second door 120 is configured such that, with respect to the end thereof that is adjacent to the roof 200, the opposite end thereof is opened by rotating upwards in the height direction of the vehicle. A second lower door 121 is located adjacent to the opposite end of the second door 120.

Each of the first door 110, the first lower door 111, the second door 120, and the second lower door 121 may be configured to include a locking unit 130. Further, when the locking unit 130 is unlocked in response to a user request, the driving force of the drive unit 140 is applied to each of the first door 110 and the second door 120 so as to open the same.

That is, when there is an unlocking input of the locking unit 130, it may be recognized as an opening drive request of the doors 110 and 120.

In addition, when there is a closing drive request of the doors 110 and 120, the drive unit 140 applies driving force to a spindle unit 150 to close the doors 110 and 120. The closing drive request may be input through a key or a mobile terminal located outside the vehicle or through a lever located at the doors or the outer surface of the vehicle.

Figure 1:
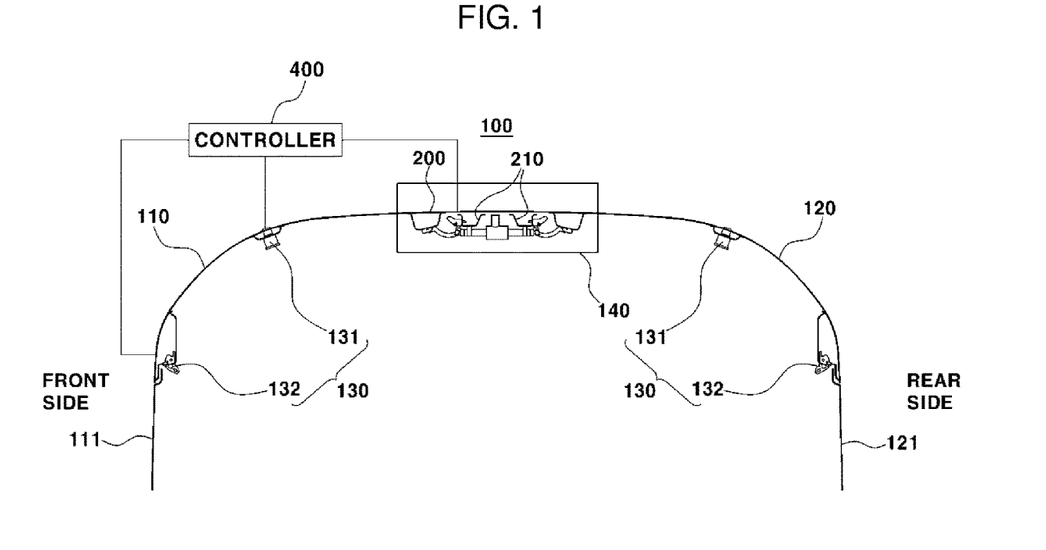
FIG. 1 is a side view of a vehicle including a bidirectional door opening structure according to an embodiment of the present disclosure.
Figure 2A:
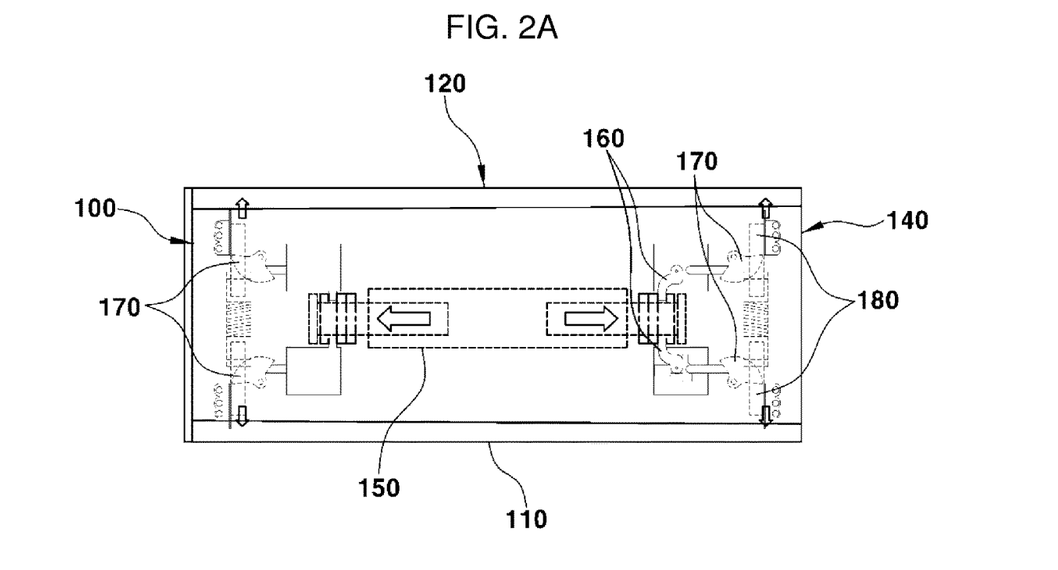
FIG. 2A is a front view of a drive unit of a bidirectional door opening structure according to an embodiment of the present disclosure.
Figure 2B:
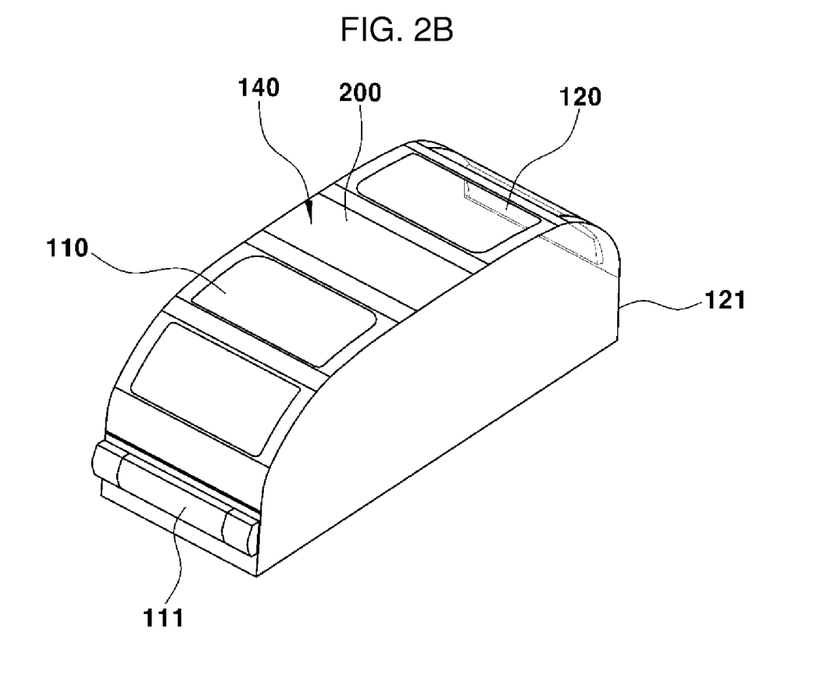
FIG. 2B is a perspective view of a vehicle including a bidirectional door opening structure according to an embodiment of the present disclosure.

FIG. 1 is a side view illustrating a structure for opening doors configured to be opened in opposite directions of the vehicle according to an embodiment of the present disclosure. FIG. 2 is a front view illustrating the drive unit 140 located at the roof 200.

As shown in the drawings, the drive unit 140 is located at the roof 200 of the vehicle. The opposite end of the first door 110 is opened by rotating about the end thereof that is adjacent to the front end of the drive unit 140. In addition, the opposite end of the second door 120 is opened by rotating about the end thereof that is adjacent to the rear end of the drive unit 140.

In addition, the first lower door 111 may be disposed below the opposite end of the first door 110 so as to be opened by rotating in a direction opposite the direction in which the opposite end of the first door 110 rotates, and the second lower door 121 may be disposed below the opposite end of the second door 120 so as to be opened by rotating in a direction opposite the direction in which the opposite end of the second door 120 rotates.

The drive unit 140 is located at the roof 200 of the vehicle, specifically, between the first door 110 and the second door 120. More preferably, the drive unit 140 is configured such that two opposite ends thereof are respectively connected to a first hinge part 300, which is located at the first door 110, and to a second hinge part 300, which is located at the second door 120. The driving force of the drive unit 140 is transmitted to the first hinge part 300 and the second hinge part 300 via the spindle unit 150.

At least one hinge part 300, which is located inside the first door 110, and at least one hinge part 300, which is located inside the second door 120, may extend to be located at respective opposite ends of the roof 200. A plurality of hinge parts 300 may be disposed perpendicular to the spindle unit 150.

In one embodiment of the present disclosure, the first hinge part 300 and the second hinge part 300 are located adjacent to the spindle unit 150, which is configured to extend in two opposite directions.

The drive unit 140 provides the spindle unit 150 for applying opening force to the first door 110 and the second door 120, and the spindle unit 150 is disposed between the first door 110 and the second door 120 such that two opposite ends thereof extend in a direction perpendicular to the first door 110 and the second door 120.

In one embodiment of the present disclosure, the spindle unit 150 is configured to be extendable and contractible in the width direction of the vehicle.

When the spindle unit 150 bidirectionally extends, the driving force of the spindle unit 150 is applied to latching levers 160, which are located adjacent to the doors. The latching levers 160 may be disposed adjacent to the inner sides of respective doors, and may be disposed so as to be symmetric to each other in the longitudinal direction of the vehicle. Further, the number of latching levers 160 is set to be the same as the number of hinge parts 300. Each of the latching levers 160 is disposed adjacent to a respective one of the hinge parts 300.

The latching lever 160 is configured such that at least a portion thereof is rotated by a driving part 161 so as to be selectively interlocked with one end of the spindle unit 150. When the driving part 161 applies driving force to the latching lever 160, a controller 400 controls the driving part 161 to move at least a portion of the latching lever 160 to a position that interferes with the path along which the spindle unit 150 moves.

In one embodiment of the present disclosure, the initial position of the latching lever 160 may interfere with the path along which the spindle unit 150 moves. In another embodiment of the present disclosure, the initial position of the latching lever 160 may not interfere with the path along which the spindle unit 150 moves. Further, the controller 400 may perform control such that the latching lever 160 is rotated so as to be selectively located in the path along which the spindle unit 150 moves.

More preferably, the latching lever 160 is controlled such that the driving force of the spindle unit 150 is transmitted thereto in order to open and close the door. In detail, the controller 400 performs control such that one end of the latching lever 160 is moved together with the spindle unit 150.

The latching lever 160, which is moved together with the spindle unit 150, is interlocked with a rotation lever 170, which is located adjacent to the outer surface of the vehicle, via a link rod 162.

The controller 400 includes a driving part 161, which applies driving force to the latching lever 160 such that one end of the latching lever 160 moves and the latching lever 160 is thus moved together with the spindle unit 150. Further, the latching lever 160 may be configured to be linearly movable or rotatable so as to be moved in the width direction of the vehicle together with the spindle unit 150.

More preferably, when the spindle unit 150 is moved toward the outer side of the vehicle and the latching lever 160 is moved together with the spindle unit 150, the door 110 (120), which is requested to be opened, is opened.

Conversely, when the spindle unit 150 is moved from the outer side of the vehicle toward the center portion of the vehicle and the latching lever 160 is moved together with the spindle unit 150, the door 110 (120), which is requested to be closed, is closed.

In summary, the spindle unit 150, which is configured to be movable in the width direction of the vehicle, and the latching lever 160, which is located adjacent to each of the doors and is configured to be movable together with the spindle unit 150, are controlled such that the door 110 (120) is opened or closed depending on the direction in which the latching lever 160 moves.

Further, the controller 400 is configured to control the position of the latching lever 160 in response to a drive request applied to each of the doors. In detail, the controller 400 is configured to set the position of the latching lever 160 in accordance with the linear movement of the spindle unit 150.

Figure 3A:
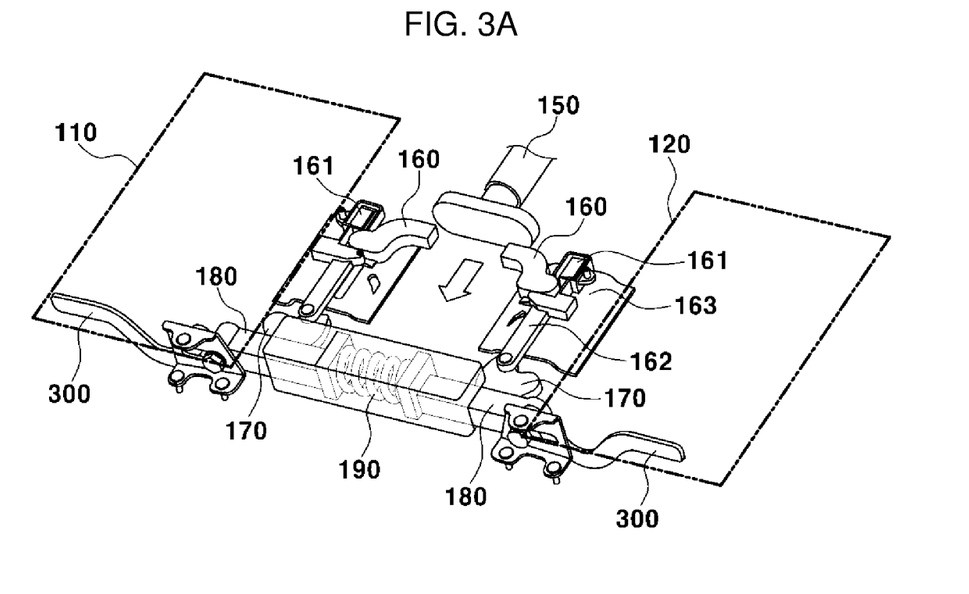
FIG. 3A is a view of the drive unit when the doors are opened by a bidirectional door opening structure according to an embodiment of the present disclosure.
Figure 3B:
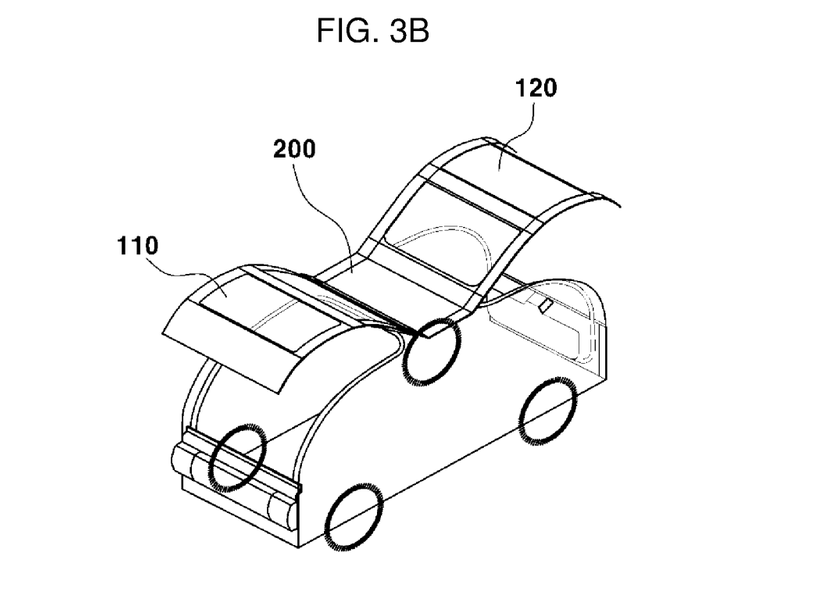
FIG. 3B is a perspective view of a vehicle when the doors are opened by a bidirectional door opening structure according to an embodiment of the present disclosure.

FIGS. 3A and 3B are views illustrating coupling relationships among the components of the drive unit 140 at one lateral side of the vehicle according to an embodiment of the present disclosure.

As shown in the drawings, when the spindle unit 150 is extended in response to a door-opening drive request input to the controller 400, any unlocked doors are opened.

The drive unit 140 is located at the roof 200, at which the upper end of the first door no and the upper end of the second door 120 are located. The drive unit 140 includes a spindle unit 150, which is configured such that the length thereof is bidirectionally increased in the width direction of the vehicle, and latching levers 160, which are located adjacent to a respective one of the doors and are configured to be selectively interlocked with the spindle unit 150.

In one embodiment of the present disclosure, in accordance with the bidirectional increase in the length of the spindle unit 150, the latching levers 160 transmit the driving force of the spindle unit 150 to the hinge parts 300 so as to open or close the first door 110 and the second door 120.

The latching levers 160 may be located at positions corresponding to two opposite ends of the spindle unit 150. Further, the latching levers 160, which are configured to apply driving force to the first door no and the second door 120 in the longitudinal direction of the vehicle, may be disposed so as to be symmetric to each other in the width direction of the vehicle.

As such, in one embodiment of the present disclosure, a plurality of latching levers 160 is disposed so as to be symmetric to each other in the width direction of the vehicle and is driven by the driving force applied thereto from the spindle unit 150 to open or close the respective doors no and 120 adjacent thereto. That is, the latching levers 160, which are located adjacent to each other in the longitudinal direction of the vehicle, are independently controlled so as to open or close two different doors 110 and 120.

The latching levers 160 may be moved by the driving parts 161, which are adjacent thereto, to positions at which the latching levers 160 interfere with the spindle unit 150. In one embodiment of the present disclosure, one end of each latching lever 160 is rotated such that at least a portion of each latching lever 160 is located in the path along which the spindle unit 150 moves.

The latching lever 160 is interlocked with the rotation lever 170 via the link rod 162. Upon rotation of the rotation lever 170, a connection rod 180 connected to the hinge part 300 is moved in the longitudinal direction of the vehicle.

The connection rod 180 is configured to move along a groove formed in a hinge plate and to apply driving force to a hinge arm in the longitudinal direction, thereby opening the door. More preferably, a rotation gear part, which is formed at one end of the rotation lever 170, and a rack gear of the connection rod 180 are engaged with each other. Thereby, the connection rod 180 is moved in the longitudinal direction in accordance with movement of the rotation lever 170.

An elastic member 190 may be provided between the first connection rod 180 and the second connection rod 180, which are respectively connected to the first hinge part 300 and the second hinge part 300 in the longitudinal direction of the vehicle. When the distance between the first connection rod 180 and the second connection rod 180 is the greatest, the elastic member 190 provides elastic force for pulling the first connection rod 180 and the second connection rod 180 toward each other. When the distance between the first connection rod 180 and the second connection rod 180 is the smallest, the elastic member 190 provides tension to the first connection rod 180 and the second connection rod 180. More preferably, when the door is changed from the opened state to the closed state, the elastic member 190 may prevent the door from suddenly descending.

The connection rod 180 is connected at one end thereof to the rotation lever 170. The connection rod 180 may include a rack gear, which has a length corresponding to the distance by which the connection rod 180 is moved by the rotation lever 170. The rack gear of the connection rod 180 is engaged with the rotation gear part of the rotation lever 170. Thereby, the connection rod 180 is moved in the longitudinal direction of the vehicle by the rotational force of the rotation gear part.

One end of the link rod 162 is eccentrically connected to the rotation lever 170. Thus, when the link rod 162 is moved in the outward direction of the vehicle, the rotation lever 170 is rotated outwards in the width direction of the vehicle, and the connection rod 180 is linearly moved in the longitudinal direction of the vehicle.

In one embodiment of the present disclosure, when a door-opening drive request signal is input to the controller 400, the controller 400 controls the latching lever 160, which corresponds to the door to which the opening request is applied, to be moved together with the spindle unit 150.

More preferably, when one end of the latching lever 160 is rotated to a position that interferes with the path along which the spindle unit 150 moves and the spindle unit 150 is extended in the width direction, the spindle unit 150 and the latching lever 160 are moved together.

The latching lever 160, which is moved together with the spindle unit 150, is moved in the same direction as the link rod 162, and the rotation lever 170, which is connected at one end thereof to the link rod 162, is rotated in conjunction with movement of the link rod 162.

In addition, the connection rod 180, which is connected to the rotation lever 170, is moved in the longitudinal direction of the vehicle in conjunction with rotation of the rotation lever 170, and the hinge part 300 is moved in the height direction of the vehicle. As such, the controller 400 controls the position of the latching lever 160 such that the door located adjacent to the latching lever 160 is opened.

The spindle unit 150, which has been extended in order to open the door, may be restored to the original position thereof when the door is completely opened. An unopened door may be opened in the manner described above.

Figure 4:
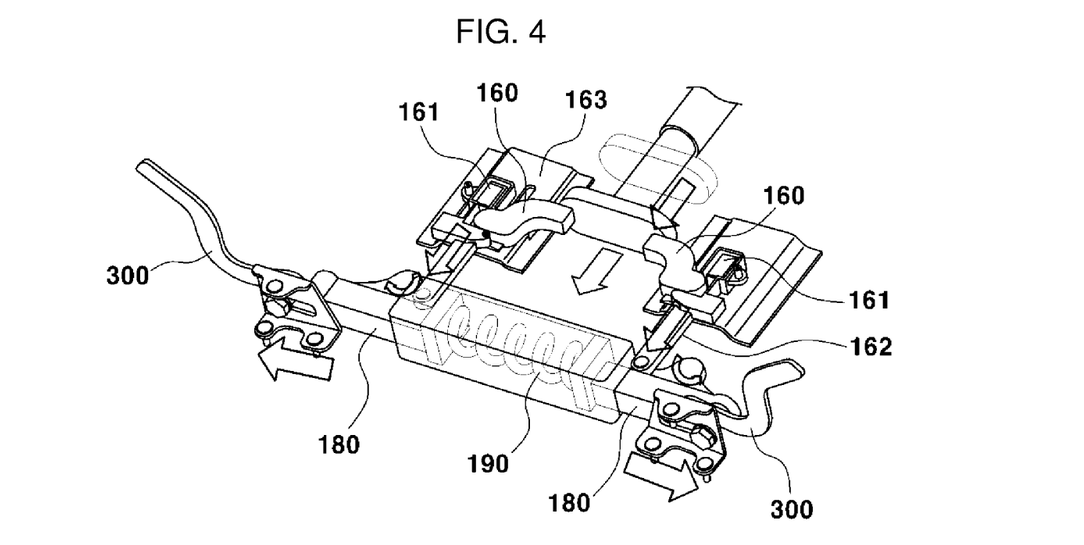
FIG. 4 is an enlarged view of an end portion of a drive unit according to an embodiment of the present disclosure.

FIG. 4 is a view illustrating coupling relationships among the components when the spindle unit 150 is contracted inwards in the width direction of the vehicle in order to close the door.

When a door-closing drive request signal is input to the controller 400, the latching lever 160 is rotated, and subsequently, the spindle unit 150 is extended so as to contact the end of the latching lever 160.

The spindle unit 150, which has been extended, is contracted, and the latching lever 160, which corresponds to the door that is requested to be closed, is moved in the direction in which the spindle unit 150 is contracted.

The controller 400 controls the spindle unit 150, which is interlocked with the end of the latching lever 160 of the door to which the closing request is applied, to be contracted. That is, the controller 400 controls the latching lever 160 and the spindle unit 150 to be moved together in order to close the door.

More preferably, the controller 400 performs control such that at least a portion of the latching lever 160 is first rotated so as to be interlocked with the spindle unit 150 and then the spindle unit 1500 is extended so as to contact the latching lever 160.

In response to the door-closing drive request, the spindle unit 150 is extended so as to contact the end of the latching lever 160. In this case, the distance that the spindle unit 150 moves may be set to be shorter than or equal to the distance that the spindle unit 150 moves in response to the door-opening drive request.

In one embodiment of the present disclosure, the door is configured to be moved downwards by the weight thereof. The connection rod 180, the link rod 162, and the rotation lever 170 are moved together in conjunction with downward movement of the door.

Further, the rotation lever 170, which is connected to the link rod 162, transmits force, which is generated by downward movement of the door, in the direction in which the spindle unit 150 is contracted.

As such, since the spindle unit 150 is contracted in conjunction with movement of the latching lever 160, it is possible to prevent the latching lever 160 from being suddenly moved.

In addition, the controller 400 may control the speed at which the spindle unit 150 is contracted, thereby controlling the speed at which the door is closed in response to the door-closing drive request.

When the spindle unit 150 is moved inwards in the width direction of the vehicle, the door is closed by the weight thereof. That is, the hinge part 300, which is connected to the connection rod 180, is moved downwards by the weight of the door, and the connection rod 180 is moved away from the hinge part 300. Accordingly, the rotation lever 170 is rotated, and the link rod 162, the latching lever 160, and the motor housing accommodating the motor are moved inwards in the width direction of the vehicle.

That is, the latching lever 160 moves along the path along which the spindle unit 150 is contracted in the width direction of the vehicle in response to the door-closing drive request input to the controller 400.

More preferably, since the spindle unit 150 is interlocked with the end of the latching lever 160 and is moved in the inward direction of the vehicle, the latching lever 160 is moved toward the center portion in the width direction of the vehicle together with the spindle unit 150. The connection rod 180 connected to the hinge part 300 of the door, the rotation lever 170, and the link rod 162 transmit force, which is generated by the weight of the door, to the latching lever 160 such that the latching lever 160 is moved toward the center portion in the width direction of the vehicle.

Further, the connection rod 180 connected to the hinge part 300 is moved away from the door, and the rotation lever 170 connected to the connection rod 180 is rotated away from the door. Further, the link rod 162 connected to the rotation lever 170 is moved, and thus the force, generated when the door is closed, is applied to the latching lever 160.

More preferably, the rack gear of the connection rod 180 is configured to move linearly, and the rotation gear part formed at the rotation lever 170 is configured to rotate.

As described above, when the door is changed from the opened state to the closed state, the door is closed by the weight thereof, and the latching lever 160, interlocked with the hinge part 300, is moved toward the center portion in the width direction of the vehicle. In addition, the spindle unit 150, which has been extended so as to contact the end of the latching lever 160, is moved toward the center portion in the width direction of the vehicle together with the latching lever 160, and the latching lever 160 is moved toward the center portion in the width direction of the vehicle in the state in which the end thereof is in contact with the spindle unit 150. Accordingly, the door is changed from the opened state to the closed state. Furthermore, when the door is moved downwards, the elastic member 190, which is disposed between the first connection rod 180 and the second connection rod 180, provides a predetermined amount of elastic force so as to prevent the door, to which the door-closing drive request is applied, from being suddenly closed.

In the state in which the door is completely closed, a stopper 167 of the latching lever 160 is rotated to be inserted into an upper fixing slot 165 formed in a transfer plate 163. Thereby, the door is maintained in the closed state.

FIGS. 5A to 5D are views illustrating the transfer plate 163, which is configured such that the latching lever 160 is located in the housing of the drive unit and is moved, and coupling relationships between the latching lever 160 and the transfer plate 163.

The latching lever 160 is configured to move on the transfer plate 163, which is coupled to the rear surface of the housing of the drive unit 140. The latching lever 160 is moved together with the spindle unit 150 along a transfer slot 164 formed in the transfer plate 163 in the width direction of the vehicle.

The latching lever 160 may be moved along the transfer slot 164 in the width direction of the vehicle in a manner such that the rotation center shaft of the latching lever 160 penetrates the transfer plate 163 through the transfer slot 164 so as to be moved along the transfer slot 164.

In addition, the latching lever 160 is provided with a stopper 167, which is disposed on one surface of the latching lever 160 that faces the transfer plate 163 and is located at a position adjacent to the end of the latching lever 160 that is rotated. The stopper 167 may be inserted into an upper fixing slot 165 or a lower fixing slot 166, thereby fixing the latching lever 160.

More preferably, in order to maintain the latching lever 160 in the state of being released from the spindle unit 150, the end of the latching lever 160 is rotated away from the spindle unit 150, and then the stopper 167 of the latching lever 160 is inserted into the upper fixing slot 165 or the lower fixing slot 166 so as to fix the latching lever 160.

Further, when the stopper 167 is inserted into the upper fixing slot 165, the driving force for opening the door is not applied to the latching lever 160 from the spindle unit 150, whereby the door is maintained in the closed state.

Meanwhile, when the stopper 167 is inserted into the lower fixing slot 166, the latching lever 160 is not located in the path along which the spindle unit 150 moves. Thus, even when the spindle unit 150 is moved in order to close the opened door, the door, which corresponds to the latching lever 160, the stopper 167 of which is inserted into the lower fixing slot 166, is maintained in the opened state.

As such, the stopper 167 is inserted into the upper fixing slot 165 or the lower fixing slot 166 formed in the transfer plate 163, thereby preventing movement of the latching lever 160. As a result, the door is maintained in the current state.

Figure 5A:
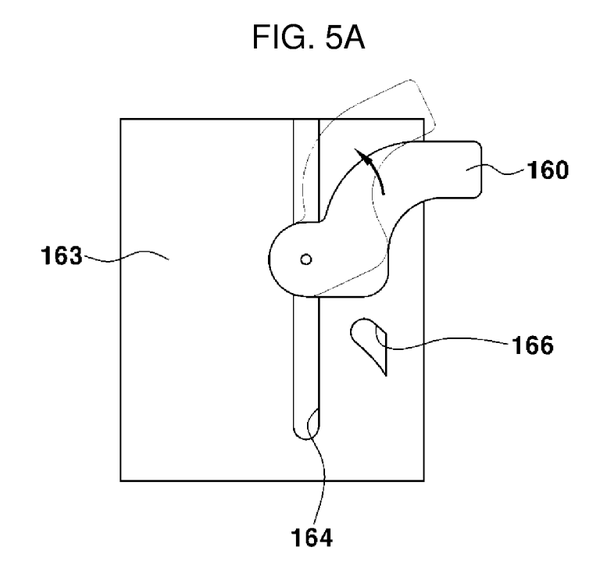
FIG. 5A is a view illustrating coupling relationships between a latching lever and a transfer plate according to an embodiment of the present disclosure.
Figure 5B:
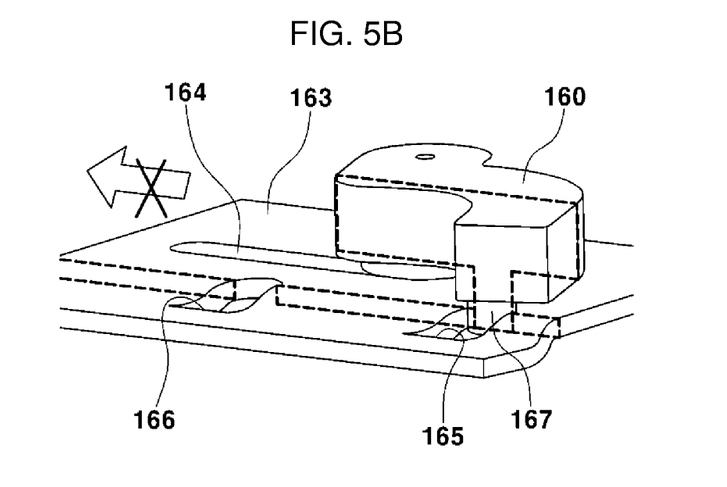
FIG. 5B is a perspective view illustrating a state in which a latching lever is fixed to a transfer plate according to an embodiment of the present disclosure.
Figure 5C:
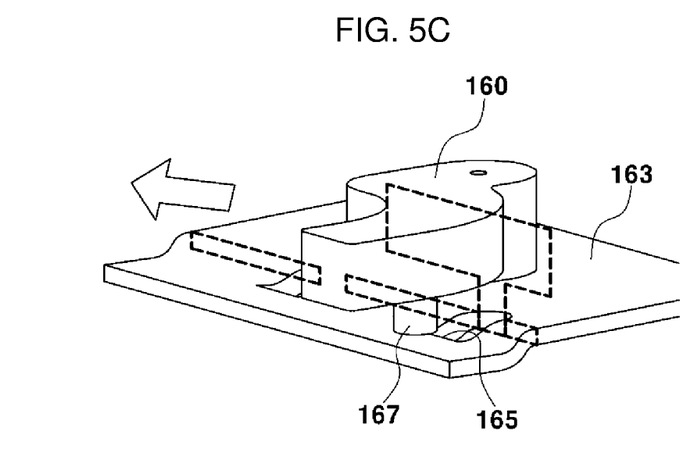
FIG. 5C is a perspective view illustrating a state in which a latching lever is released from a transfer plate according to an embodiment of the present disclosure.
Figure 5D:
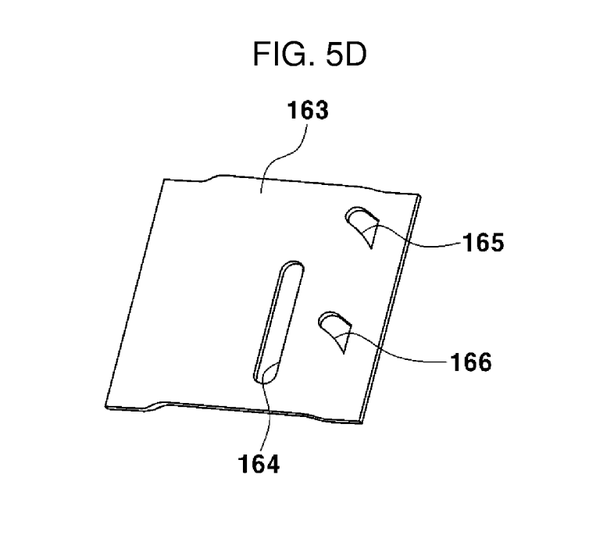
FIG. 5D is a view illustrating a configuration of a transfer plate according to an embodiment of the present disclosure.

FIG. 5B is a view illustrating the state in which the stopper 167 is inserted into the upper fixing slot 165 in order to prevent the latching lever 160 from being moved in the width direction of the vehicle, and FIG. 5C is a view illustrating the state in which the end of the latching lever 160 is rotated to be located in the path along which the spindle unit 150 moves so as to be moved together with the spindle unit 150.

Further, as shown in FIG. 5C, the transfer plate 163 includes a depressed portion, which extends in the width direction of the vehicle such that the stopper 167 is separated from the upper fixing slot 165 or the lower fixing slot 166 when the latching lever 160 is rotated.

When the end of the latching lever 160 is rotated so as to avoid interference with the path along which the spindle unit 150 moves, the stopper 167 of the latching lever 160 is inserted into and fixed in the upper fixing slot 165 or the lower fixing slot 166.

Meanwhile, when the end of the latching lever 160 is rotated to a position that interferes with the path along which the spindle unit 150 moves, the stopper 167 of the latching lever 160 is released from the transfer plate 163 and is located above the depressed portion of the transfer plate 163. As a result, the stopper 167 is moved along the depressed portion formed in the transfer plate 163.

Figure 6:
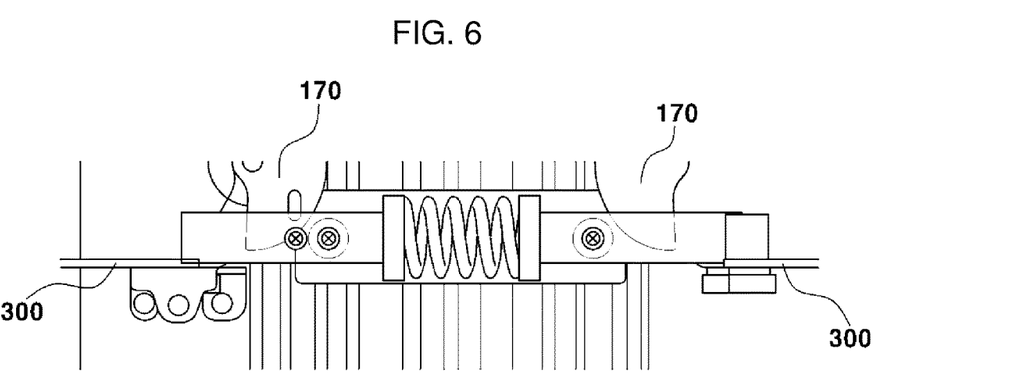
FIG. 6 is an enlarged view illustrating coupling relationships between connection rods according to an embodiment of the present disclosure.

FIG. 6 is an enlarged view illustrating coupling relationships between the first door no and the second door 120, each of which includes a respective one of the connection rods 180, according to an embodiment of the present disclosure.

Each of the connection rods 180 is coupled to a respective one of the first door 110 and the second door 120. The connection rods 180 are disposed adjacent to each other in the longitudinal direction of the vehicle. The hinge part 300 is connected to the end of each of the connections rods 180 that is oriented outwards in the longitudinal direction of the vehicle. The hinge part 300 is configured to be secured to the inner side of the door.

The elastic member 190, which is disposed between the connection rods 180, is configured to apply elastic force to the connection rods 180 depending on a change in the distance between the connection rods 180.

That is, the space between the neighboring connection rods 180 may be expanded or contracted in the longitudinal direction of the vehicle depending on rotation of the rotation lever 170. In addition, a hinge arm is disposed in the path along which each connection rod 180 is extended such that each connection rod 180 is extended in the longitudinal direction and is interlocked with the hinge arm. When each connection rod 180 is extended in the longitudinal direction, the hinge arm is rotated in the height direction of the vehicle, whereby the corresponding door is opened.

The hinge part 300 includes a hinge arm and a hinge plate, and further includes a groove formed in the hinge plate such that the connection rod 180 moves along the hinge plate, thereby guiding movement of the connection rod 180 in the longitudinal direction.

The hinge plate is secured to the housing of the drive unit 140 and to the end of the hinge arm that is close to the door. The opposite end of the door is opened by rotating about the hinge arm coupled to the hinge plate.

As described above, the elastic member 190 is disposed between the connection rods 180, each of which is connected to the corresponding hinge arm. Thus, the length of the elastic member 190 may vary between the state in which the distance between the connection rods 180 is the greatest and the state in which the distance between the connection rods 180 is the smallest.

Even when only one of the connection rods 180, which are disposed adjacent to each other, is moved in the longitudinal direction, the length of the elastic member 190 is changed so as to apply elastic force to the connection rods 180.

For example, when the distance between the connection rods 180 is the greatest, the elastic member 190 may apply elastic force to the connection rods 180 such that the connection rods 180 are pulled toward each other, and when the distance between the connection rods 180 is the smallest, the elastic member 190 may apply elastic force to the connection rods 180 such that the connection rods 180 are pushed away from each other.

When the door is opened, the elastic member 190, disposed between the connection rod 180, may apply tension to the connection rods 180 such that the connection rods 180 are easily moved in the longitudinal direction of the vehicle. When the door is changed from the opened state to the closed state, the elastic member 190 may provide elastic force such that the connection rods 180 are moved close to each other.

Further, when the door, which is changed from the opened state to the closed state, is inclined downwards at a predetermined angle or less, the elastic member 190 may apply elastic force to the connection rods 180 in the direction in which the distance between the connection rods 180 increases, thereby preventing the door from suddenly descending.

Hereinafter, the operation of an embodiment of the present disclosure will be described. Embodiments of the present disclosure provide a bidirectional door opening structure capable of simultaneously or selectively opening the first door and the second door using a single drive unit. That is, it is possible to simultaneously open or close the first door and the second door or to open or close only one of the first door and the second door. Hereinafter, the operation in which the first door no is maintained in the closed state and the second door 120 is changed from the closed state to the opened state and the operation of the drive unit 140 in accordance with application of the door-closing drive request to the first door no in the state in which the first door 110 and the second door 120 are opened will be described.

Figure 7:
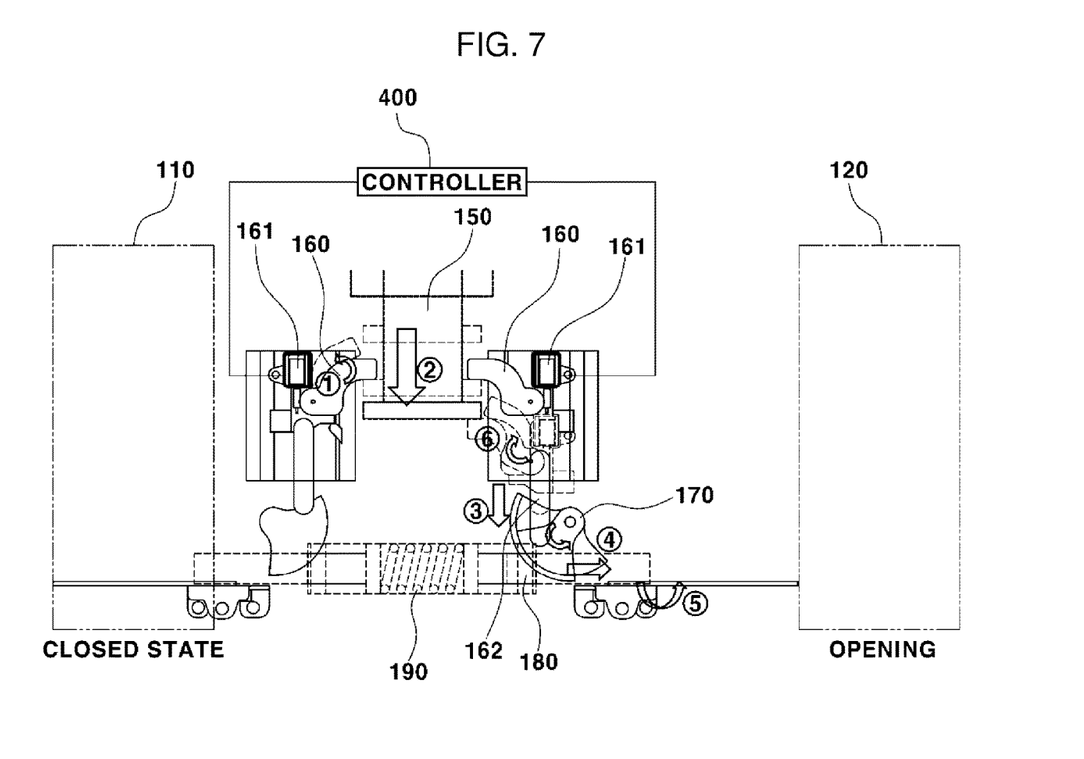
FIG. 7 is a view illustrating an operation in which a second door is opened while a first door is maintained in a closed state.

FIG. 7 is a view illustrating the operation in which the second door 120 is changed from the closed state to the opened state and the first door 110 is maintained in the closed state in the bidirectional door opening structure according to an embodiment of the present disclosure.

The spindle unit 150 is extended in the width direction of the vehicle in response to a drive input signal applied to the controller 400. The controller 400 performs control such that at least a portion of the latching lever 160, which corresponds to the door to which the door-opening drive request signal is applied, is located in the path along which the spindle unit 150 moves. The latching lever 160 is also moved in conjunction with extension of the spindle unit 150. The latching lever 160, which is interlocked with the first door no to which no signal is applied, is controlled through the driving part 161 so as to be moved to a position at which the latching lever 160 does not interfere with the spindle unit 150.

More preferably, the controller 400 controls the position of each latching lever 160 through the driving part 161. In detail, the controller 400 controls the position of each latching lever 160 such that the latching lever 160, which corresponds to the door to which a drive request is applied, is moved together with the spindle unit 150.

When the spindle unit 150 is extended in the width direction, the latching lever 160, which is adjacent to the second door 120, is moved together with the spindle unit 150, and the latching lever 160, which is adjacent to the first door no, is fixed by the stopper 167 being inserted into the upper fixing slot 165.

The latching lever 160, which is adjacent to the second door 120, rotates the end of the rotation lever 170 toward the second door 120 together with the link rod 162. The end of the connection rod 180, which is interlocked with the rotation lever 170, is moved close to the second door 120.

The connection rod 180, which is moved close to the second door 120, is moved along the hinge plate so as to contact one end of the hinge arm, and the opposite end of the hinge arm is rotated with respect to the hinge plate by the connection rod 180, thereby applying opening force to the second door 120.

In summary, the position of each of the latching levers 160, which is disposed adjacent to a respective one of the first door no and the second door 120, is controlled such that the driving force of the spindle unit 150 is transmitted to the hinge part 300 of the door to which the door-opening drive request is applied. In addition, the controller 400 performs control such that the driving force of the spindle unit 150 is not applied to the door to which no door-opening drive request is applied.

Figure 8:
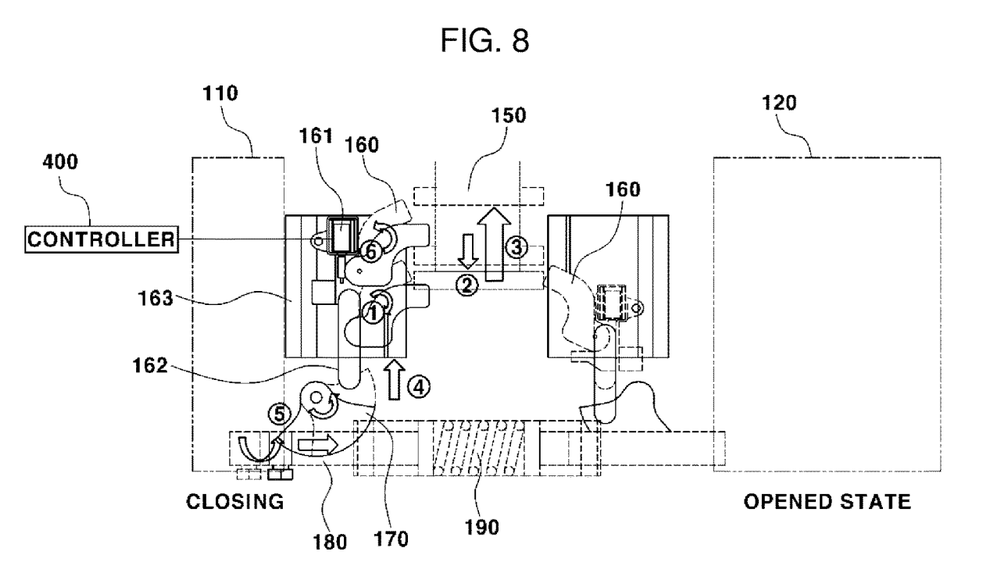
FIG. 8 is a view illustrating an operation in which a first door is closed while a second door is maintained in an opened state.

FIG. 8 is a view illustrating the operation of the drive unit 140 in accordance with application of the door-closing drive request to the first door 110 in the state in which the first door 110 and the second door 120 are opened in the bidirectional door opening structure according to an embodiment of the present disclosure.

The controller 400 controls the latching lever 160 to be contracted together with the spindle unit 150 in response to a remote input by the user or a door-closing drive request input through a lever.

One end of the latching lever 160 is rotated by the driving part 161 so as to be interlocked with the spindle unit 150. Thus, when the spindle unit 150, which is located so as to be in contact with the end of the latching lever 160, is contracted, the latching lever 160 of the door to which the door-closing drive request is applied is controlled by the controller 400 so as to be moved together with the spindle unit 150.

More preferably, in one embodiment of the present disclosure, when the door-closing drive request is applied to the first door 110, the spindle unit 150 is controlled to be extended so as to contact the end of the latching lever 160 that corresponds to the first door no. Subsequently, the spindle unit 150 is controlled to be contracted toward the center portion of the vehicle so as to control the speed at which the latching lever 160 is moved by the weight of the door. When the door-closing drive input is applied to the first door 110, one end of the latching lever 160 is rotated by the driving part 161 so as to be interlocked with the spindle unit 150, and the spindle unit 150 is controlled to be extended so as to contact the end of the latching lever 160. Thereafter, the latching lever 160 is moved in conjunction with contraction of the spindle unit 150 in the direction in which the spindle unit 150 is contracted. When the latching lever 160 is moved and reaches a position farthest from the outer side of the vehicle, the controller 400 controls the latching lever 160 using the driving part 161 such that the end of the latching lever 160 is restored to the original position thereof so as to be released from the spindle unit 150.

More preferably, the controller 400 applies rotational force to the latching lever 160 through the driving part 161, and controls the stopper 167 to be inserted into the upper fixing slot 165 such that the latching lever 160 is released from the spindle unit 150.

In the state in which the latching lever 160 is moved in the direction in which the spindle unit 150 is contracted and is located at a position closest to the center portion of the vehicle, that is, in the state in which the spindle unit 150 is contracted to the maximum extent, the controller 400 controls the end of the latching lever 160 to be rotated such that the latching lever 160 is fixed to the transfer plate 163.

The hinge arm is rotated in conjunction with downward movement of the first door 110, and the connection rod 180, which is connected to the hinge arm, and the rotation lever 170 are moved together. Further, the latching lever 160, which is connected to the rotation lever 170 via the link rod 162, is moved toward the center portion of the vehicle.

When the latching lever 160 is moved toward the center portion of the vehicle, the spindle unit 150, which is located so as to be in contact with the end of the latching lever 160, is contracted while controlling the speed at which the latching lever 160 is moved.

On the other hand, the latching lever 160 that is adjacent to the second door 120 is fixed to the transfer plate 163 irrespective of movement of the spindle unit 150, whereby the second door 120 is maintained in the opened state. More preferably, the stopper 167 of the latching lever 160 that is adjacent to the second door 120 is inserted into the lower fixing slot 166, whereby the latching lever 160 is fixed to the transfer plate 163.

In conclusion, even when the first door no is changed from the opened state to the closed state, the second door 120 is capable of being maintained in the opened state. The latching lever 160 adjacent to the first door no and the latching lever 160 adjacent to the second door 120 are independently controlled by the controller 400, and thus the doors are independently interlocked with the spindle unit 150, thereby satisfying the door drive request input by the user.

As described above, embodiments of the present disclosure provide the bidirectional door opening structure 100 capable of selectively controlling opening and closing of the first door 110 or the second door 120 in response to the door drive request input by the user by controlling the spindle unit 150 and the latching levers 160, each of which is interlocked with a corresponding one of the first door no and the second door 120.

As is apparent from the above description, the bidirectional door opening structure according to embodiments of the present disclosure has the following effects.

Embodiments of the present disclosure are capable of simultaneously or selectively opening a first door and a second door using a single drive unit, thereby enabling simplification of the structure.

In addition, the first door and the second door are capable of being independently opened and closed in response to a door drive request input by a user, thereby improving the convenience of the user.

The foregoing detailed description of the present disclosure is merely illustrative. The foregoing content is intended to illustrate and describe exemplary embodiments of the present disclosure, and the present disclosure may be used in various other combinations, modifications, and environments. That is, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. A bidirectional door opening structure, comprising:
a first door configured to be opened by rotating about a first end of a vehicle that is adjacent to a roof of the vehicle;
a second door formed corresponding to the first door, the second door being configured to be opened by rotating about a second end of the vehicle that is adjacent to the roof of the vehicle, the second end being opposite the first end;
a drive unit disposed at a portion of the roof between the first door and the second door, the drive unit being configured to open and close the first door and the second door; and
a controller configured to receive a door drive request with respect to the first door or the second door and to apply a driving force to at least one of the first door or the second door that is requested to be driven through the drive unit,
wherein the drive unit comprises:
a spindle unit configured such that a length thereof is bidirectionally increased in a width direction of the vehicle;
a latching lever configured to be interlocked with the spindle unit such that a driving force of the spindle unit is applied thereto; and
a rotation lever configured to convert the driving force transmitted from the latching lever into the driving force applied in a longitudinal direction of the vehicle.

2. The bidirectional door opening structure of claim 1, further comprising:
a connection rod configured to be moved in the longitudinal direction in accordance with rotation of the rotation lever, the connection rod being connected at an end thereof to a hinge part coupled to an inner side of a corresponding one of the first door and the second door,
wherein, when the rotation lever is rotated, the connection rod is configured to be moved in the longitudinal direction of the vehicle to open or close a corresponding one of the first door and the second door through the hinge part.

3. The bidirectional door opening structure of claim 2, wherein the connection rod comprises a first connection rod interlocked with the first door and a second connection rod interlocked with the second door, wherein the bidirectional door opening structure further comprises:
an elastic member disposed between the first connection rod and the second connection rod,
wherein, when a distance between the first connection rod and the second connection rod increases or decreases, the elastic member is configured to apply elastic force in a direction opposite a direction in which the first connection rod and the second connection rod are moved.

4. The bidirectional door opening structure of claim 2, wherein the rotation lever and the connection rod are engaged with each other using gears, and wherein, when the rotation lever is rotated, the connection rod is configured to move in the longitudinal direction of the vehicle.

5. The bidirectional door opening structure of claim 1, wherein the controller is configured to move at least a portion of the latching lever, located corresponding to at least one of the first door or the second door that is requested to be driven, such that the latching lever is interlocked with the spindle unit.

6. The bidirectional door opening structure of claim 5, wherein the controller comprises a driving part configured to apply the driving force to the latching lever, located corresponding to the at least one of the first door or the second door that is requested to be driven, such that at least a portion of the latching lever is located in a path along which the spindle unit moves.

7. The bidirectional door opening structure of claim 1, further comprising a link rod disposed between the latching lever and the rotation lever.

8. The bidirectional door opening structure of claim 1, wherein, upon receiving the door drive request, the controller is configured to control the spindle unit to be driven.

9. A bidirectional door opening structure, comprising:
a first door configured to be opened by rotating about a first end of a vehicle that is adjacent to a roof of the vehicle;
a second door formed corresponding to the first door, the second door being configured to be opened by rotating about a second end of the vehicle that is adjacent to the roof of the vehicle, the second end being opposite the first end;
a drive unit disposed at a portion of the roof between the first door and the second door, the drive unit being configured to open and close the first door and the second door; and
a controller configured to receive a door drive request with respect to the first door or the second door and to apply a driving force to at least one of the first door or the second door that is requested to be driven through the drive unit,
wherein the drive unit comprises:
a spindle unit configured such that a length thereof is bidirectionally increased in a width direction of the vehicle;
a latching lever configured to be interlocked with the spindle unit such that a driving force of the spindle unit is applied thereto; and
a rotation lever configured to convert the driving force transmitted from the latching lever into the driving force applied in a longitudinal direction of the vehicle;
wherein the bidirectional door opening structure further comprises a transfer plate on which the latching lever is disposed and a transfer slot formed in the transfer plate; and
wherein a rotation shaft of the latching lever is configured to move along the transfer slot by the spindle unit.

10. The bidirectional door opening structure of claim 9, further comprising:

a stopper disposed on one surface of the latching lever that faces the transfer plate; and a fixing slot formed in the transfer plate, wherein, in a state in which the latching lever is released from the spindle unit, the stopper is fixed in the fixing slot, and wherein, when the latching lever is interlocked with the spindle unit, the stopper is released from the fixing slot.

11. The bidirectional door opening structure of claim 10, wherein the fixing slot comprises:

a lower fixing slot into which the stopper is inserted in a state in which a corresponding one of the first door and the second door is opened; and an upper fixing slot into which the stopper is inserted in a state in which the corresponding one of the first door and the second door is closed.

12. A vehicle comprising:

a vehicle body having a roof;

a first door configured to be opened by rotating about a first end of the vehicle that is adjacent to the roof of the vehicle;

a second door configured to be opened by rotating about a second end of the vehicle that is adjacent to the roof of the vehicle, the second end being opposite the first end;

a drive unit disposed at a portion of the roof between the first door and the second door, the drive unit being configured to open and close the first door and the second door, wherein the drive unit comprises a spindle unit configured such that a length thereof is bidirectionally increased in a width direction of the vehicle, a latching lever configured to be interlocked with the spindle unit such that a driving force of the spindle unit is applied thereto, and a rotation lever configured to convert the driving force transmitted from the latching lever into the driving force applied in a longitudinal direction of the vehicle; and a controller configured to receive a door drive request with respect to the first door or the second door and to apply a driving force to at least one of the first door or the second door that is requested to be driven through the drive unit.

13. The vehicle of claim 12, further comprising:

a connection rod configured to be moved in the longitudinal direction in accordance with rotation of the rotation lever, the connection rod being connected at an end thereof to a hinge part coupled to an inner side of a corresponding one of the first door and the second door, wherein, when the rotation lever is rotated, the connection rod is configured to be moved in the longitudinal direction of the vehicle to open or close a corresponding one of the first door and the second door through the hinge part.

14. The vehicle of claim 13, wherein the connection rod comprises a first connection rod interlocked with the first door and a second connection rod interlocked with the second door, wherein the vehicle further comprises:

an elastic member disposed between the first connection rod and the second connection rod, wherein, when a distance between the first connection rod and the second connection rod increases or decreases, the elastic member is configured to apply elastic force in a direction opposite a direction in which the first connection rod and the second connection rod are moved.

15. The vehicle of claim 13, wherein the rotation lever and the connection rod are engaged with each other using gears, and wherein, when the rotation lever is rotated, the connection rod is configured to move in the longitudinal direction of the vehicle.

16. The vehicle of claim 12, wherein the controller is configured to move at least a portion of the latching lever, located corresponding to at least one of the first door or the second door that is requested to be driven, such that the latching lever is interlocked with the spindle unit, and wherein the controller comprises a driving part configured to apply the driving force to the latching lever, located corresponding to the at least one of the first door or the second door that is requested to be driven, such that at least a portion of the latching lever is located in a path along which the spindle unit moves.

17. The vehicle of claim 12, further comprising a link rod disposed between the latching lever and the rotation lever.

18. The vehicle of claim 12, wherein, upon receiving the door drive request, the controller is configured to control the spindle unit to be driven.

19. The vehicle of claim 12, further comprising:

a transfer plate on which the latching lever is disposed; and a transfer slot formed in the transfer plate, wherein a rotation shaft of the latching lever is configured to move along the transfer slot by the spindle unit.

20. The vehicle of claim 19, further comprising:

a stopper disposed on one surface of the latching lever that faces the transfer plate; and a fixing slot formed in the transfer plate, wherein, in a state in which the latching lever is released from the spindle unit, the stopper is fixed in the fixing slot, and wherein, when the latching lever is interlocked with the spindle unit, the stopper is released from the fixing slot.

* * * * *